US012166763B2

(12) United States Patent
Gourlay et al.

(10) Patent No.: US 12,166,763 B2
(45) Date of Patent: Dec. 10, 2024

(54) USING SYNTHETIC PACKETS TO VALIDATE FORWARDING AND CONTROL IMPLEMENTATION ON NETWORK SYSTEMS

(71) Applicant: Arista Networks, Inc., Santa Clara, CA (US)

(72) Inventors: Douglas Alan Gourlay, San Francisco, CA (US); Kenneth James Duda, San Clara, CA (US); Fred Lo-Tze Hsu, Santa Clara, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 380 days.

(21) Appl. No.: 17/752,497

(22) Filed: May 24, 2022

(65) Prior Publication Data

US 2023/0412601 A1 Dec. 21, 2023

(51) Int. Cl.
*H04L 9/40* (2022.01)
*H04L 41/0654* (2022.01)
*H04L 41/0659* (2022.01)
*H04L 41/0816* (2022.01)
*H04L 43/026* (2022.01)
*H04L 47/2441* (2022.01)

(52) U.S. Cl.
CPC ........ *H04L 63/101* (2013.01); *H04L 41/0654* (2013.01); *H04L 41/0816* (2013.01); *H04L 47/2441* (2013.01); *H04L 63/20* (2013.01)

(58) Field of Classification Search
CPC .............. H04L 63/101; H04L 41/0654; H04L 41/0816; H04L 47/2441; H04L 63/20; H04L 41/0659; H04L 43/026
See application file for complete search history.

(56) References Cited

U.S. PATENT DOCUMENTS

| | | | | |
|---|---|---|---|---|
| 11,483,202 | B2 * | 10/2022 | Cheng | H04L 43/067 |
| 12,028,408 | B2 * | 7/2024 | Black | H04L 63/0272 |
| 2015/0092785 | A1 * | 4/2015 | Torvi | H04L 45/12 370/401 |
| 2022/0021729 | A1 * | 1/2022 | Bobbitt | H04L 41/0826 |
| 2022/0210715 | A1 * | 6/2022 | Deixler | H04L 41/0816 |
| 2022/0316914 | A1 * | 10/2022 | Lenz | G05D 1/0274 |
| 2023/0360338 | A1 * | 11/2023 | Mao | H04N 23/695 |

\* cited by examiner

*Primary Examiner* — Harry H Kim

(74) *Attorney, Agent, or Firm* — Fountainhead Law Group, PC

(57) ABSTRACT

A method for managing a network includes obtaining network flow data corresponding to a network device in the network, determining, based on the network flow data, configuration coverage associated with forwarding control configuration of the network device, identifying, using the configuration coverage and the forwarding control configuration, non-coverage, generating a plurality of synthetic packets based on the non-coverage, transmitting the plurality of synthetic packets to the network device, obtaining a set of results associated with the plurality of synthetic packets, making a determination, based on the set of results, that the network device is not implementing at least a portion of the non-coverage correctly, and based on the determination, performing a remediation action on the network device.

19 Claims, 6 Drawing Sheets

USING SYNTHETIC PACKETS TO VALIDATE FORWARDING AND CONTROL IMPLEMENTATION ON NETWORK SYSTEMS

BACKGROUND

During operation of a network, it may be desirable to monitor the network to determine whether the configuration of the network devices in the network are implemented correctly. The monitoring may include observing the data traffic on a network device and determining whether the network device is properly configured.

DETAILED DESCRIPTION

Figure 1:
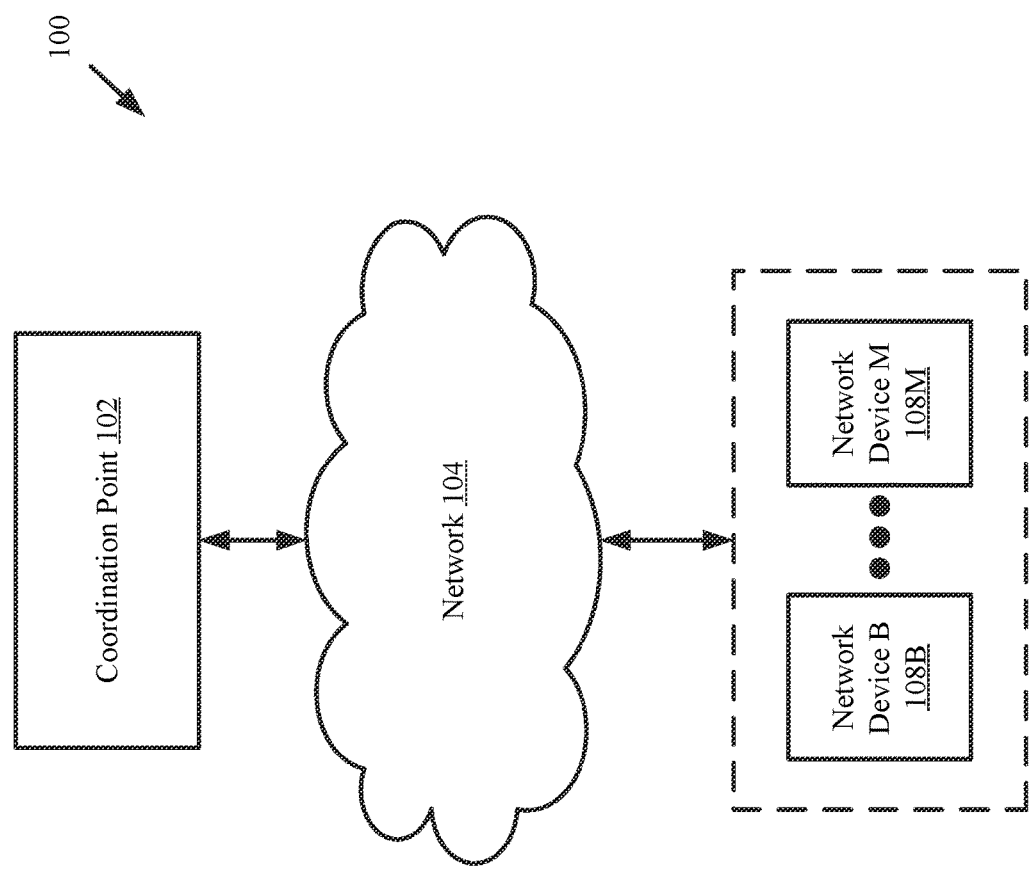
FIG. 1 shows a system in accordance with one or more embodiments.

The processing of packets received by a network device may be managed using, e.g., forwarding control configuration. The forwarding control configuration determines whether a given packet should be dropped, processed by the network device and not forwarded, or forwarded (without or with additional processing by the network device) to another device, e.g., a server, mobile device, another network device, etc. To implement all or some of the aforementioned functionality, the forwarding control configuration may include, for example, access control lists (ACLs).

The ACL of a network device may include any number of ACL entries. Each ACL entry may include the network device is authorized to transmit a packet to a particular second network device (or set of network devices). For example, the network device implementing the ACL entry may utilize the packet header of incoming packets and the ACL entry to make a determination about whether there is authorization for the packet to be delivered to the second network device.

In current implementations, the determination of whether a given ACL entry is operating correctly is based on whether or not the network device has received packets that trigger the use of the ACL entry. When the use of a given ACL is triggered (e.g., a packet with a header that matches the ACL entry is received), the administrator can determine whether or not this ACL entry operated correctly. For example, if applying the ACL entry to the packet should have resulted in the packet being dropped, then the administrator can determine if in-fact the packet was dropped. If the packet was dropped, then the packet administrator is able to confirm that the ACL entry is operating correctly; however, if the packet is forwarded, then the administrator is able to determine that the ACL entry is not operating correctly and that additional corrective action may need to be taken.

While the above approach allows the administrator to determine whether certain ACL entries are operating correctly or as expected, this approach does not enable the administrator to determine whether ACL entries that are not triggered are operating correctly. As such, an administrator of a network may not be aware of whether unused ACL entries of a network device will operate correctly. The lack of awareness may become problematic in future operations of the network should the ACL entries not be implemented correctly. For example, a network device configured or otherwise behaving undesirably may inadvertently: (i) allow undesired network devices to transmit or obtain data, or (ii) prevent network devices from transmitting data properly across the network.

To provide monitoring of such unused ACL entries, embodiments disclosed herein may relate to systems and methods for utilizing synthetic packets for the purpose of evaluating the configuration (including the forwarding control configuration) of network devices. Embodiments disclosed herein may include a network monitoring manager (also referred to as a coordination point) that initiates a configuration analysis by obtaining network flow data for one or more of the network devices in a network. The network monitoring manager may utilize the obtained network flow data to determine a configuration coverage. The configuration coverage may include (i) a set of ACL entries of a network device that have been utilized during a predetermined period of time (collectively referred to as "covered ACL entries") and (ii) a set of ACL entries that have not been used during the predetermined period of time (collectively referred to as "non-covered ACL entries").

In one or more embodiments, the configuration coverage (e.g., covered ACL entries) may be determined by evaluating the network flow data and the ACL entries. For example, each ACL entry may be associated with values for one or more header fields in a packet. This information is used to determine when to apply a given ACL to a packet. The network flow data may be used to identify the packets that have been processed by the network device. Once the packets are identified, the header information of these packets may be compared to the values of the one or more header fields specified in each of the ACL entries. When there is a match between the header fields for the ACL entry and the packet, then the ACL is determined to be a covered ACL entry.

Once the covered ACL entries are identified, the remaining ACL entries that are programmed into the network device that are not covered ACL entries are designated as non-covered ACL entries.

Embodiments disclosed herein may include generating synthetic packets that are each designed to include header information that would require a network device to utilize one (or more) of the non-covered ACL entries.

For example, consider a scenario in which one of the non-covered ACL entries specifies allowing packets to be transmitted to a next hop network device if the source network device is network device A. In this example, a synthetic packet is generated and injected into network device B, which implements the ACL entry and is an intermediate network device between network device A and network device C. The synthetic packet specifies network device A as the source and network device C as the destination. Network device B may record the results of implementing the ACL entry (e.g., whether the synthetic packet was forwarded or dropped), and the recorded result is provided to the network monitoring manager.

Embodiments disclosed herein may perform a similar process as the one discussed in the above example for each non-covered ACL entry. Specifically, the network monitoring manager may generate a synthetic packet corresponding to each of the non-covered ACL entries, inject the synthetic packets into the network such that the synthetic packets are received by the network device being analyzed, and obtain the results for the network device.

In one or more embodiments, the synthetic packets are injected by sending the packets directly to the network device being analyzed via a connection between the network monitoring manager and the network device being tested. Alternatively, one or more of the synthetic packets are injected to an intermediate network device, and the intermediate network device may be instructed to transmit the one or more synthetic packets to the network device being analyzed. In these alternative embodiments, the network monitoring manager allows the network device being analyzed to test the ingress interface and its effects on the implementation of the ACL entries.

In one or more embodiments, following the results of the configuration analysis, if the configuration analysis indicates an ACL entry is implemented incorrectly, a remediation action may be performed. The remediation action may include, for example, rebooting the network device, quarantining the network device, installing new software on the network device, and performing additional analyses on the network device in a quarantined state, and/or disabling the ACL entry (or all ACL entries) on the network device and reinstalling a new ACL entry (or new set of ACL entries) on the network device. Other remediation actions may be performed without departing from this disclosure.

While the disclosure discusses the monitoring, evaluation, and remediation of forwarding control configuration that includes access control lists, embodiments disclosed herein may include other forwarding control configurations such as, for example, routing policies or quality of service (QoS) configurations. Other forwarding control configurations may be monitored, evaluated, and/or remediated without departing from this disclosure.

Various embodiments of the disclosure are described below.

FIG. 1 shows a system in accordance with one or more embodiments disclosed herein. The system (100) includes a coordination point (102) operatively connected to one or more network device(s) (108B, 108M) through a network (104). Each of these components is described below.

In one or more embodiments disclosed herein, the coordination point (102) is a computing device that manages a set of network devices (e.g., 108B, 108M). In one or more embodiments disclosed herein, a computing device is any physical or virtual device that may be used for performing various embodiments. The physical device may correspond to any physical system (see e.g., FIG. 5) with functionality to implement one or more embodiments disclosed herein. For example, the physical device may be a server (i.e., a device with at least one or more processor(s), memory, and an operating system) that is directly (or operatively) connected to at least one network device (e.g., 108B, 108M).

Alternatively, the physical device may be a special purpose computing device that includes one or more application-specific processor(s) (or hardware) configured to only execute embodiments disclosed herein. In such cases, the physical device may implement embodiments disclosed herein in hardware as a family of circuits and may retain limited functionality to receive input and generate output in accordance with various embodiments disclosed herein. In addition, such computing devices may use a state-machine to implement various embodiments disclosed herein.

In another embodiment, the physical device may correspond to a computing device that includes one or more general purpose processor(s) and one or more application-specific processor(s) (or hardware). In such cases, one or more portions disclosed herein may be implemented using the operating system and general purpose processor(s), while one or more portions disclosed herein may be implemented using the application-specific processor(s) (or hardware).

In one or more embodiments, the coordination point (102) may correspond to a virtual machine or a container. Virtual machines are distinct operating environments configured to inherit underlying functionality of the host operating system (and access to the underlying host hardware) via an abstraction layer. In one or more embodiments disclosed herein, a virtual machine includes a separate instance of an operating system, which is distinct from the host operating system. Containers are isolated user space instances that execute on a common operating system (e.g., Docker™ container)

In one or more embodiments, the coordination point (102) may be implemented in a virtual machine executing on a network device. In another embodiment disclosed herein, the coordination point may be implemented in a virtual machine executing on a server that is operatively (or directly) connected to one or more network device(s).

In one or more embodiments, the coordination point (102) includes executable instructions (stored in a non-transitory computer readable medium (not shown)), which when executed, enable the coordination point to perform the methods described below (see e.g., FIG. 3). The coordination point (102) may also include additional functionality to manage the network devices. In one or more embodiments, the coordination point is implemented as a physical network controller or a virtual network controller.

In one or more embodiments, the one or more network device(s) (108B, 108M) are physical devices that process packets (including synthetic packets). In one or more embodiments, the network device may include functionality to perform functions described in accordance with one or more embodiments disclosed herein. In one or more embodiments, the functions of the network device include implementing forwarding control configuration. The forwarding control configuration may include, but is not limited to, routing policies, access control lists (ACLs), and quality of service (QoS) policies. For additional details regarding the forwarding control configuration, see, e.g., FIG. 2.

Examples of network devices include, but are not limited to, a router, a switch, and a multilayer switch. The network device is not limited to the aforementioned specific examples. Additional detail about a network device is described below with respect to FIG. 2.

In one or more embodiments, the network (104) may be the medium through which the coordination point (102) and the one or more network device(s) (108B, 108M) are operatively connected. In one or more embodiments disclosed herein, the network may include other network devices (or systems) (not shown) that facilitate communication between the aforementioned components. As such, in one or more embodiments disclosed herein, the network may include any combination of local and/or wide area (e.g., Internet) network segments that may be wire-based and/or wireless and that may use any combination of wired and/or wireless communication protocols.

The technology is not limited to the system shown in FIG. 1. More specifically, while the system shown in FIG. 1 includes a single coordination point, embodiments disclosed herein may be implemented using multiple coordination points, where the multiple coordination points are configured such that if one of the multiple coordination points fails, the other coordination points may continue to operate and provide the functionality described below (see e.g., FIG. 3) to the network devices (108B, 108M).

Figure 2:
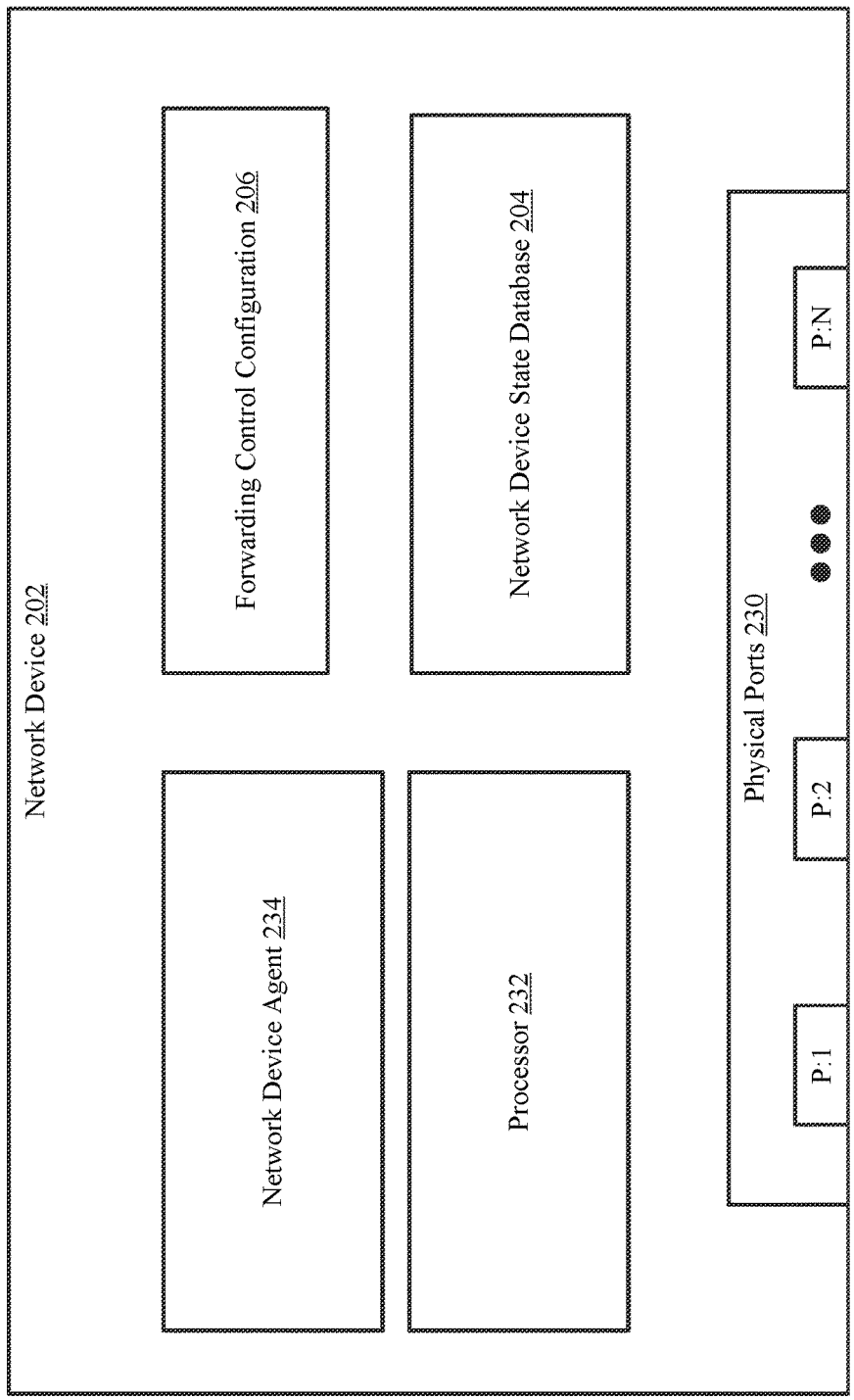
FIG. 2 shows a network device in accordance with one or more embodiments.

FIG. 2 shows a network device in accordance with one or more embodiments disclosed herein. In one or more embodiments disclosed herein, a network device (202) is a physical device that includes persistent storage, memory (e.g., Random Access Memory), one or more processors (232) (including, e.g., a switch chip), a network device state database (204), and two or more physical ports (230). In one or more embodiments disclosed herein, the switch chip is hardware that determines which egress port on the switch to forward media access control (MAC) frames. The switch chip may include egress and ingress ports that may connect to ports on the switch. Each port may or may not be connected to another device on a network (e.g., a server, a switch, a router, etc.). The network device may be configured to receive packets via the ports and determine whether to (i) drop the packet, (ii) process the packet in accordance with one or more embodiments disclosed herein, and/or (iii) send the packet, based on the processing, out another port on the network device.

Figure 3:
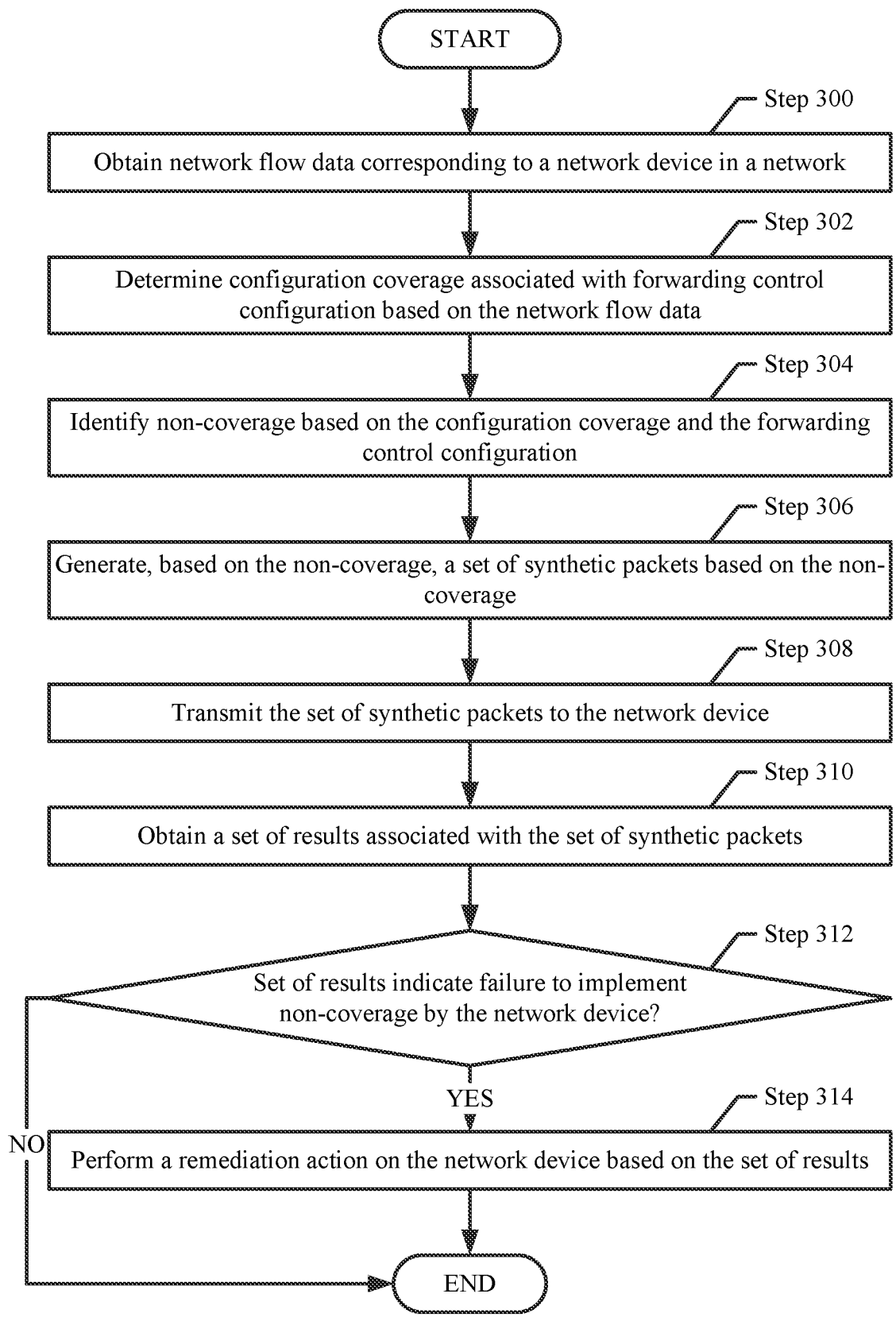
FIG. 3 shows a flowchart for managing forward control behavior of a network device in accordance with one or more embodiments.

In one or more embodiments disclosed herein, the persistent storage in the network device may include any type of non-transitory computer readable medium that includes instructions, which, when executed by one or more processors in the network device, enable the network to perform the functions described in accordance with one or more embodiments disclosed herein (see e.g., FIG. 3).

In one or more embodiments disclosed herein, the functionality of the network device may be logically divided into a control plane and data plane (not shown). The data plane includes functionality to receive packets (denoted as ingress packets) via ports (230), process the packets (as described above) and, as appropriate, transmit packets (denoted as egress packets) via the ports towards a destination.

In one or more embodiments, the control plane includes functionality to manage the overall operation of the network device. More specifically, the control plane includes functionality to manage the operation of the data plane. The control plane may also include functionality to gather and send state information to the coordination point. In addition, the control plane may also include functionality to receive state information from the coordination point and process the received state information.

In one or more embodiments, the forwarding control configuration (206) includes any additional information that may be used to take into account when forwarding a packet. Examples of the additional information included in the forwarding control configuration (206) include, but are not limited to: source address, destination address, an access control list (ACL), a quality of service (QoS), media access control (MAC) tables, address resolution protocol (ARP) tables, a link status between the network device (202) and the other network devices in the network, a layer-3 forwarding information base (FIB) table, a policy based routing (PBR) configuration, and a DirectFlow configuration. The forwarding control configuration (206) may be installed by an administrator configuring the network device (202). Alternatively, the forwarding control configuration (206) may be received by the network device (202) from a coordination point (e.g., 102, FIG. 1) and subsequently installed on the network device.

In one or more embodiments, the control plane may manage the operation of the data plane by implementing the forwarding control configuration (206). In one or more embodiments, the forwarding control configuration (206) includes entries (e.g., ACL entries) used to configure the forwarding management of the network device (202). For example, the entries may specify whether a packet is to be transmitted or dropped based on, e.g., the source L2 address or source L3 address specified in the header of the packet. As a second example, the entries may include forwarding policies to be implemented based on the source or destination addresses (e.g., which egress port to transmit a packet through based on a L2 address or L3 address). As a third example, the entries of the forwarding control configuration (206) may include QoS configurations, which are used to determine how to process packets received by the network device.

In one or more embodiments disclosed herein, the network device state database (204) includes the current state of the network device. The state information that is stored in the network device state database (204) may include, but is not limited to: (i) information about all services currently executing on the network device; (ii) the version of all software executing on the network device; (iii) the version of all firmware executing on the network device; (iv) all hardware version information for all hardware in the network device; (v) information about the current state of all tables (e.g., routing table, forwarding table, etc.) in the network device that are used to process packets (described below), where the information may include the current entries in each of the tables; (vi) information about each of the services/protocols/features configured on the network device (e.g., MLAG, LACP, VXLAN, LLDP, Tap Aggregation, Data Center Bridging Capability Exchange, ACL, VLAN, VRRP, VARP, STP, OSPF, BGP, RIP, BDF, MPLS, PIM, ICMP, IGMP, etc.), where this information may include information about the current configuration and status of each of the services/protocols/features); and (vii) network flow data. The network device state database (204) may include other information without departing from the disclosure.

In one or more embodiments disclosed herein, the network device state database (204) may be implemented using any type of database (e.g., a relational database, a distributed database, etc.) Further, the network device state database (204) may be implemented in-memory (i.e., the contents of the network device state database (204) may be maintained in volatile memory). Alternatively, the network device state database (204) may be implemented using persistent storage. In another embodiment disclosed herein, the network device state database (204) is implemented as an in-memory database with a copy of the network device state database (204) being stored in persistent storage. In such cases, as changes are made to the in-memory database, copies of the changes (with a timestamp) may be stored in persistent storage. The use of an in-memory database may provide faster access to the contents of the network device state database (204).

Those skilled in the art will appreciate that while the term database is used above, the network device state database (204) may be implemented using any known or later developed data structure(s) to manage and/or organize the content in the network device state database (204).

In one or more embodiments, the network device (202) includes a network device agent (234). The network device agent (234) may be implemented as a physical device. The physical device may be a special purpose computing device that includes one or more application-specific processor(s) (or hardware) configured to execute embodiments disclosed herein. In such cases, the physical device may implement embodiments disclosed herein in hardware as a family of circuits and may retain limited functionality to receive input and generate output in accordance with various embodiments disclosed herein. Alternatively, the network device agent (234) may be implemented as a software process executing on the processor (232). The network device agent (234) may be implemented in either the data plane or the control plane of the network device (202).

The network device agent (234) includes functionality to evaluate incoming and outgoing traffic (e.g., including the synthetic packets) of the network device (202). Specifically, the network device agent (234) may track which of the set of synthetic packets are dropped and the egress port from which each of the non-dropped synthetic packet is transmitted. Additional details regarding the operation of the network device agent (234) is described below in FIG. 3.

FIG. 3 shows a flowchart for a method for managing forward control behavior of a network device in accordance with one or more embodiments. The method may be performed by, for example, coordination point (e.g., 102 in FIG. 1). Other entities in the network device may perform the method of FIG. 3 without departing from embodiments disclosed herein.

While the various steps in the flowchart shown in FIG. 3 are presented and described sequentially, one of ordinary skill in the relevant art, having the benefit of this document, will appreciate that some or all of the steps may be executed in different orders, that some or all of the steps may be combined or omitted, and/or that some or all of the steps may be executed in parallel.

In step 300, network flow data corresponding to a network device (hereinafter referred to as the evaluated network device) in a network is obtained. In one or more embodiments, the network flow data specifies traffic (e.g., packets) obtained from and transmitted by the evaluated network device. The network flow data may be obtained using any known or later discovered network monitoring protocols and/or mechanisms. Non-limiting examples of network monitoring protocols and/or mechanisms include flow and in-band network telemetry. The network flow data may include, for example, copies of the packets received by the evaluated network device, copies of the packets transmitted by the evaluated network device, flow records (e.g., IP Flow Information Export (IPFIX) records).

In step 302, configuration coverage associated with forwarding control configuration is determined based on the network flow data. In one or more embodiments, the configuration coverage is determined by obtaining a copy of the forwarding control configuration. The copy of the forwarding control configuration may be obtained from the network device or obtained from an administrator that provides the forwarding control configuration that is intended to be installed in the evaluated network device. The forwarding control configuration may also be present on the coordination point and, as such, it does not need to be obtained from an external source.

In one or more embodiments, the configuration coverage is determined by performing an analysis on the network flow data and the obtained forwarding control configuration to determine the entries of the forwarding control configuration that have been implemented to perform the network flow are specified in the network flow data. The analysis may include: (i) identifying a packet (or a flow) specified in the network flow data using <source IP address, source TCP/UDP port, destination IP address, destination TCP/UDP port and IP protocol>, and (ii) determining whether there are zero, one or more entries in the forwarding control configuration associated with the identified packet (or flow). Any identified entries are then included in the configuration coverage. Said another way, a given entry is deemed to be "covered" when at least one packet specified in the network flow data has been processed using the entry. The result of step 302 is zero, one or more entries that have been used to process at least one packet that was received or transmitted by the network device.

Continuing with the discussion of FIG. 3, in step 304, non-coverage is determined based on the configuration coverage and the forwarding control configuration. In one or more embodiments, the non-coverage is determined by comparing the determined configuration coverage of step 302 to the obtained forwarding control configuration to identify zero, one or more entries of the forwarding control configuration that are not specified in the configuration coverage. The zero, one or more entries of the forwarding control configuration that are not specified in the configuration coverage are deemed the non-coverage. Said another way, a given entry is deemed to be "non-covered" when the entry has not processed any packets specified in the network flow data, at least during a predetermined period of time.

In step 306, a set of synthetic packets are generated based on the non-coverage. In one or more embodiments, each of the synthetic packets is designed to trigger performance of one or more of the entries of the non-coverage. For example, a synthetic packet may include a L2 source address specified by an entry of the non-coverage for the purpose of determining whether to allow transmission or drop packets that include such L2 source address. In this manner, each synthetic packet in the set, when processed by the evaluated network device, may be used to evaluate the implementation of one or more of the entries of the non-coverage by the network device.

Continuing with the discussion of FIG. 3, in step 308, the set of synthetic packets is transmitted to the evaluated network device or to an network device operatively connected to the evaluated network device. In one or more embodiments, the set of synthetic packets are transmitted to the network device based on a connection between the evaluated network device and the coordination point. For example, the coordination point may include an egress port that is directly connected to an ingress port of the evaluated network device. In this manner, the transmission of the synthetic packets to the evaluated network device (also referred to as an injection of the synthetic packets) may be accurately tracked with minimal variance of the intermediate entities (e.g., other network devices) used to transmit the synthetic packets.

In another example, the coordination point may transfer at least a portion of the set of synthetic packets to a network device that is operatively connected to the evaluated network device. The network device, upon receiving at least the portion of the set of synthetic packets, will transmit them to the evaluated network device. The transmitted synthetic packets will then be processed by the evaluated network device using one or more entries in the forwarding control configuration of the evaluated network device.

Continuing with the discussion of FIG. 3, in step 310, a set of results associated with the set of synthetic packets is obtained. In one or more embodiments, the results are obtained based on a monitoring of the network to track the transmission of the synthetic packets by the evaluated network device (e.g., after the injection of the synthetic packets to the network device). The monitoring includes tracking one or more of the network devices operatively connected to the evaluated network device to determine whether the synthetic packets are transmitted from the evaluated network device. The coordination point may determine whether each of the synthetic packets are transmitted correctly following the implementation of the forwarding control configuration by the evaluated network device. The aforementioned determinations may be included in the set of results.

In one or more embodiments, the set of results are generated by the evaluated network device. In one or more embodiments, a network device agent of the evaluated network device monitors the incoming and outgoing traffic (e.g., including the synthetic packets) of the evaluated network device. Specifically, the network device agent tracks which of the set of synthetic packets are dropped and the egress port from which each of the non-dropped synthetic packet is transmitted. The set of results may specify which synthetic packets were dropped and which were transmitted from the evaluated network device.

The monitoring in step 310 may include the same or substantially the same monitoring that was used to generate the network flow data that was used in step 302.

In step 312, a determination is made about whether the set of results indicate a failure, by the network device, to properly implement one or more entries that were previously identified as part of the non-coverage. In one or more embodiments, the determination is made by evaluating the set of results. The evaluation may be used to determine, for example, whether any failure scenario has occurred. The following describes three non-limiting failure scenarios. The disclosure is not limited to these examples. The first failure scenario may be that one or more synthetic packets was transmitted from the evaluated network device that were not expected to be transmitted. The second failure scenario may be that one or more synthetic packets was dropped at the evaluated network device where such dropped synthetic packets were expected to be transmitted. The third failure scenario may be one where a packet is sent to an incorrect network device (i.e., the packet is permitted to be transmitted but not to the network device to which it was sent).

The set of results may indicate a failure if any failure scenario occurs. If the set of results indicate a failure to properly implement the non-coverage, the method proceeds to step 314; otherwise, the method ends following step 314.

In step 314, a remediation action is performed on the evaluated network device. In one or more embodiments, a remediation action includes rebooting the evaluated network device. In this manner, the evaluated network device is reset to implement the forwarding control configuration properly. In another embodiment, the remediation action includes generating, by the coordination point, a new forwarding control configuration (e.g., a new ACL), and installing the new forwarding control configuration on the evaluated network device. In another embodiment, the remediation action includes re-evaluating the network device by quarantining the network device (e.g., prevent any connection to or from the network device) and perform an evaluation on the network device to determine a configuration issue that is the cause of the failure scenarios identified in step 312. The configuration issue may be a hardware issue of the network device, a software issue, and/or a connectivity issue. The evaluation may be performed by an administrator of the network operating via the coordination point. The administrator, via the coordination point, may connect to the network device, initiate the quarantine, perform the evaluation, and determine the configuration issue. Based on the configuration issue, the coordination point may perform any actions to resolve the configuration issue. In another embodiment, the remediation action includes installing updated software on the network device. The installed updated software may be new forwarding control configuration. Alternatively, the installed updated software includes additional configuration to prevent the misapplication of the forwarding control configuration. The installed updated software may be installed in the data plane or the control plane without departing from the disclosure.

The method shown in FIG. 3 may be performed on-demand (i.e., when the administrator requests the method to be performed), periodically (e.g., every day), or when an event occurs (e.g., one hour after the forward control configuration has changed). Further, while the method shown in FIG. 3 uses network flow data, those skilled in the art will appreciate that the network flow data may be continuously obtained by the coordination point even when the method in FIG. 3 is not performed.

The method shown in FIG. 3 is described as being performed by a coordination point; however, the method shown in FIG. 3 may be performed by the evaluated network device or another network device that is operatively connected to the evaluated network device without departing from the disclosure.

Example

Figure 4A:
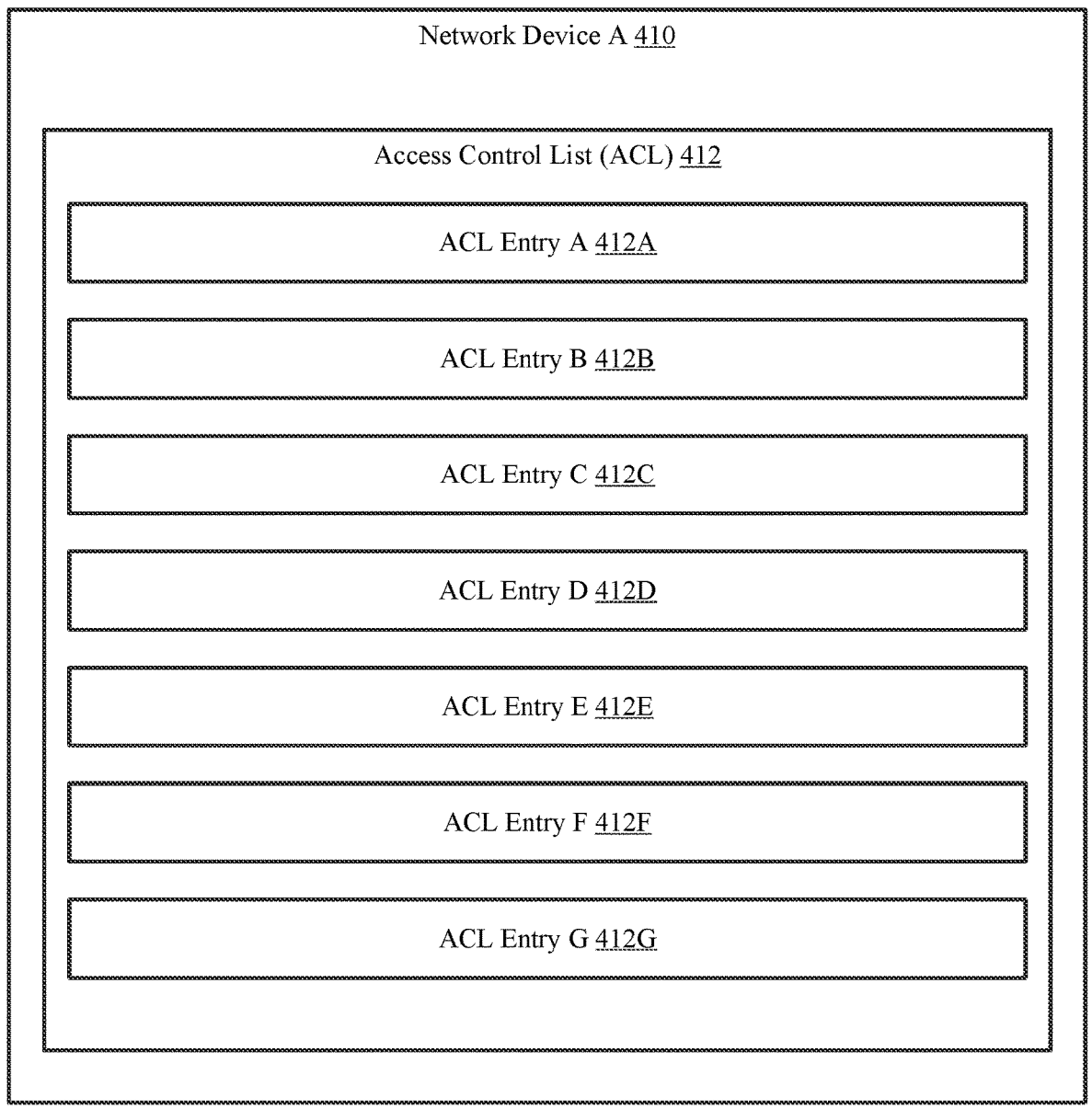
FIGS. 4A-4B shows an example in accordance with one or more embodiments disclosed herein.
Figure 4B:
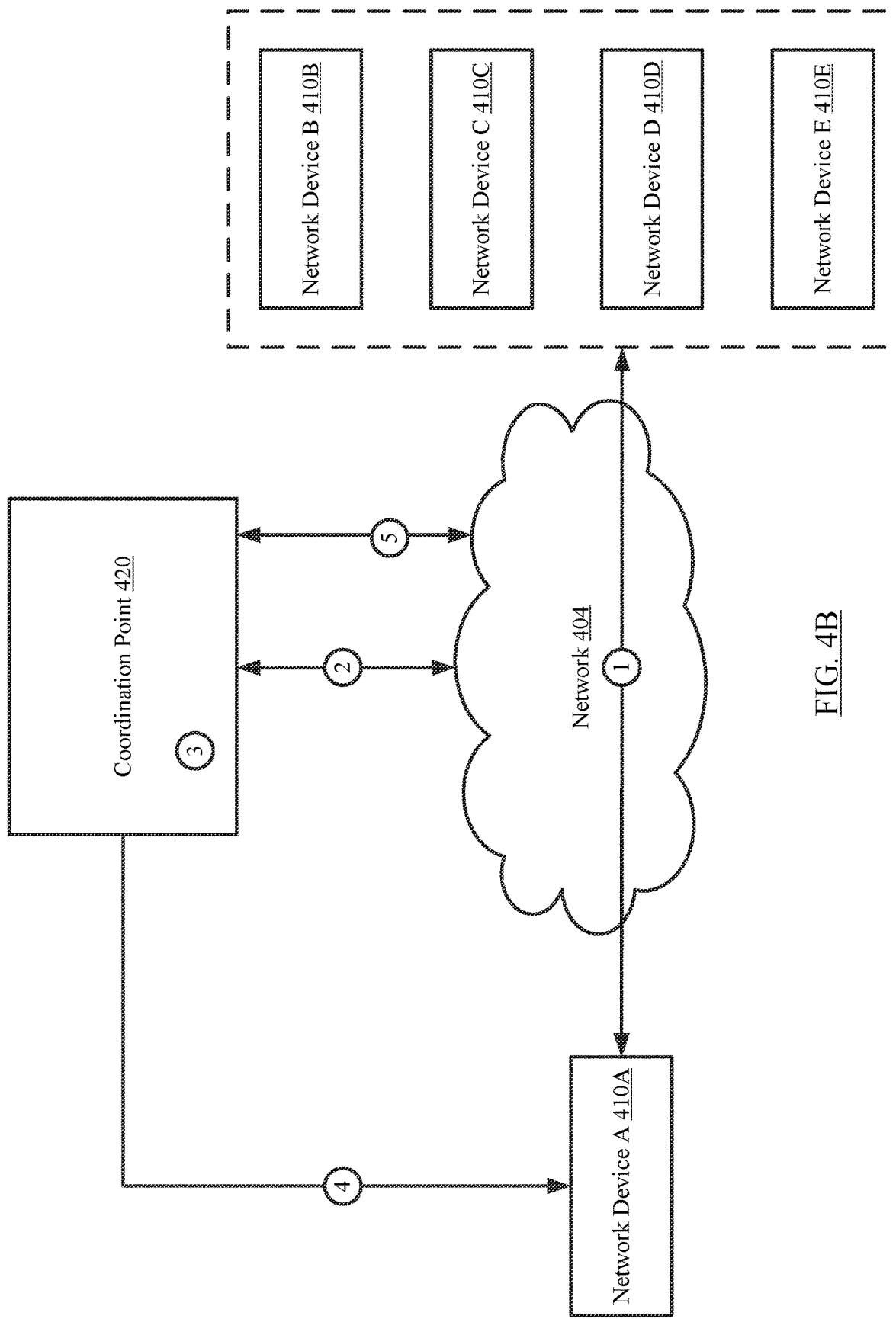

FIGS. 4A-4B shows an example in accordance with one or more embodiments disclosed herein. The example is not intended to limit the scope disclosed herein. Turning to the example, consider a scenario in which a network device receives and transmits packets in accordance with a forwarding control configuration implemented as an access control list (ACL).

Turning to FIG. 4A, network device A (410) includes and implements an access control list (ACL) (412). The ACL (412) includes ACL entries A-G (412A, 412B, 412C, 412D, 412E, 412F, 412G). Each ACL entry specifies a condition for either authorizing an incoming packet for forwarding to the next network device or for dropping the packet based on a source IP address and/or the destination IP address of the packet. In this example, ACL entry A (412A) specifies dropping a packet if it specifies network device B (not shown in FIG. 4A) as a destination address and also specifies one of a predetermined list of network devices as the source address. Continuing this example, ACL entry B (412B) specifies dropping any packets intended to be transmitted to network device C. For the sake of brevity, the contents of ACL entries C-G (412C, 412D, 412E, 412F, 412G) are not discussed in this example.

Turning to FIG. 4B, as discussed above, network device A (410) transmits packets to and obtains packets from network devices B (410B), network device C (410C), network device D (410D), and network device E (410E) across the network (404) [1]. The transmission of packets across the network (404) is monitored by a coordination point (420). Based on the monitoring, the coordination point (420) collects network data flow [2] for a period of time. The network data flow specifies the packets transmitted to network device A (410A) and from network device A (410A). The network flow data is used to determine the ACL entries that were used for the network traffic through network device A (410A). In this example, ACL entries A (412A), C (412C), F (412F), and G (412G) were used and, as such, are referred to as the configuration coverage for network device A (410A). The coordination point (420), using the configuration coverage and a stored copy of the ACL of network device A (410A), identifies the non-coverage (i.e., the ACL entries that have not been implemented during this period of time) [3]. In this example, the non-coverage includes ACL entries B, D, and E (412B, 412D, 412E).

Based on the determined non-coverage, a set of synthetic packets are generated for the intention of evaluating the ACL entries in the non-coverage. As such, three synthetic packets are generated for the three ACL entries of the non-coverage. Each of the three synthetic packets specify L2 and/or L3 addresses associated with an ACL entry in the non-coverage. The three synthetic packets are injected to network device A (410A) [4]. In this example, coordination point (420) has a direct connection to network device A (410A). Based on the direct connection, coordination point (420) sends the three synthetic packets via the direct connection.

Following the injection of the three synthetic packets, the network (404) is monitored by the coordination point (420) to determine whether the synthetic packets are transmitted correctly by network device A (410A) across the network (404) [5]. Specifically, the coordination point monitors the network (404) to determine whether: (i) the synthetic packets are transmitted if the transmission is expected based on the implementation of the ACL by network device A (410A), or (ii) if the synthetic packets are dropped if this is expected based on said implementation. In this example, the synthetic packets are transmitted (or dropped) correctly, confirming the evaluation of the ACL.

End of Example

Figure 5:
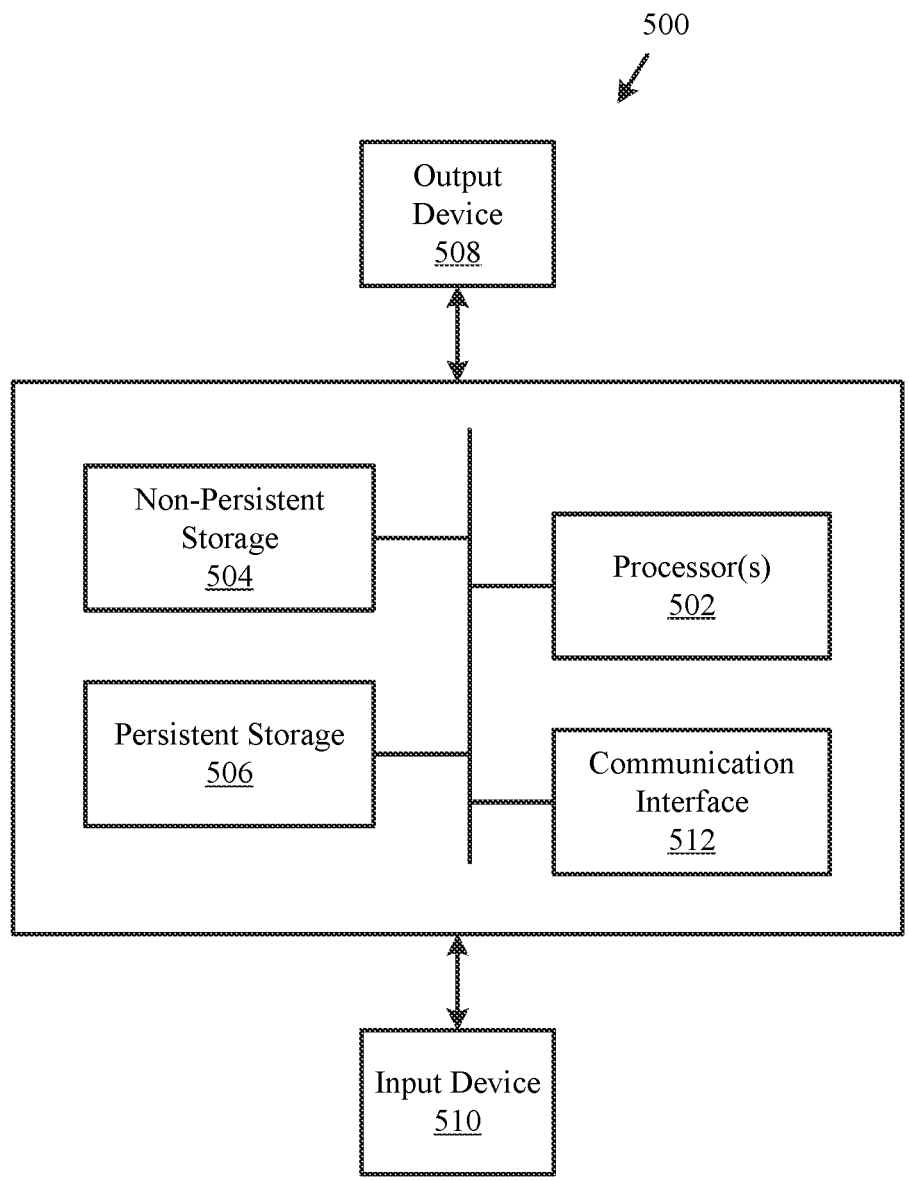
FIG. 5 shows a computing system in accordance with one or more embodiments disclosed herein.

Embodiments of the technology may be implemented on a computing system. Any combination of mobile, desktop, server, embedded, or other types of hardware may be used. For example, as shown in FIG. 5, the computing system (500) may include one or more processor(s) (502), non-persistent storage (504) (e.g., random access memory (RAM), cache memory, flash memory, etc.), persistent storage (506) (e.g., a hard disk, an optical drive such as a compact disk (CD) drive or digital versatile disk (DVD) drive, a flash memory stick, etc.), and numerous other elements and functionalities. The processor(s) (502) may be an integrated circuit for processing instructions. For example, the processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a communication interface (512) that accesses a network (e.g., a local area network (LAN), a wide area network (WAN) such as the Internet, mobile network, or any other type of network). The input and output device(s) may be locally or remotely (e.g., via the communication interface (512)) connected to the processor(s) (502), non-persistent storage (504), and persistent storage (506). Many different types of computing systems exist, and the aforementioned input and output device(s) may take other forms.

Software instructions in the form of computer readable medium program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the technology.

Specific embodiments disclosed herein have been described in detail with reference to the accompanying figures. Like elements in the various figures are denoted by like reference numerals for consistency.

In the above detailed description of embodiments disclosed herein, numerous specific details are set forth in order to provide a more thorough understanding disclosed herein. However, it should be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection. While the technology has been described with respect to a limited number of embodiments, those skilled in the art, having benefit of this disclosure, will appreciate that other embodiments can be devised which do not depart from the scope disclosed herein as disclosed herein. Accordingly, the scope disclosed herein should be limited only by the attached claims.

What is claimed is:

1. A method for managing a network, the method comprising:
   obtaining network flow data corresponding to a network device in the network;
   determining, based on the network flow data, configuration coverage associated with forwarding control configuration of the network device;
   identifying, using the configuration coverage and the forwarding control configuration, non-coverage, wherein the non-coverage specifies at least a portion of the forwarding control configuration that has not yet been utilized by the network device during normal operation of the network device;
   generating a plurality of synthetic packets based on the non-coverage;
   transmitting the plurality of synthetic packets to the network device;
   obtaining a set of results associated with the plurality of synthetic packets;

making a determination, based on the set of results, that the network device is not implementing at least a portion of the forwarding control configuration associated with the non-coverage correctly; and based on the determination, initiating a remediation action on the network device.

2. The method of claim 1,
wherein the forwarding control configuration comprises an access control list (ACL),
wherein the non-coverage comprises non-covered ACL entries of the ACL,
wherein the set of results comprises a result indicating that the network device transmitted a synthetic packet to a second network device,
wherein making the determination comprises determining that an ACL entry of the non-covered ACL entries improperly permitted the transmission of the synthetic packet.

3. The method of claim 1,
wherein the forwarding control configuration comprises an access control list (ACL),
wherein the non-coverage comprises non-covered ACL entries of the ACL,
wherein the set of results comprises a result indicating that the network device dropped a synthetic packet obtained from a second network device;
wherein making the determination comprises determining that an ACL entry of the non-covered ACL entries improperly dropped the synthetic packet.

4. The method of claim 1, wherein the remediation action comprises rebooting the network device.

5. The method of claim 1,
wherein the non-coverage comprises non-covered ACL entries of an access control list (ACL),
wherein the remediation action comprises installing a new ACL entry on the network device, wherein the new ACL entry replaces at least one of the non-covered ACL entry that was not implemented correctly.

6. The method of claim 1, wherein the remediation action comprises:
quarantining the network device;
performing an evaluation on the network device to determine a configuration issue; and
resolving the configuration issue.

7. The method of claim 1, wherein the network flow data is obtained based on packets transmitted by the network device to other network devices in the network.

8. A coordination point operating on a network, comprising:
a processor programmed to:
obtain network flow data corresponding to a network device in the network;
determine, based on the network flow data, configuration coverage associated with an access control list (ACL) of the network device;
identify, using the configuration coverage and the ACL, non-covered ACL entries of the ACL,
generate a synthetic packet based on the non-covered ACL entries;
providing the synthetic packet to a second network device, wherein the second network device transmits the synthetic packet to the network device;
obtain a result associated with the synthetic packet from the network device;
make a determination, based on the result, that the network device is not implementing at least one of the non-covered ACL entries correctly; and
based on the determination, initiate a remediation action on the network device.

9. The coordination point of claim 8, wherein the result indicates that the network device forwarded the synthetic packet to a third network device.

10. The coordination point of claim 8, wherein the result indicates that the network device dropped a packet obtained from the second network device.

11. The coordination point of claim 8, wherein the remediation action comprises initiating a rebooting of the network device.

12. The coordination point of claim 8, wherein the remediation action comprises providing a new ACL on the network device.

13. The coordination point of claim 8, wherein the remediation action comprises:
quarantining the network device;
performing an evaluation on the network device to determine a configuration issue; and
initiating resolution of the configuration issue.

14. The coordination point of claim 8, wherein the network flow data is obtained based on packets transmitted by the network device to other network devices in the network.

15. A method for managing a network device, the method comprising:
obtaining network flow data corresponding to the network device;
generating a plurality of synthetic packets;
transmitting the plurality of synthetic packets to the network device;
obtaining a set of results associated with the plurality of synthetic packets;
making a determination, based on the set of results, that the network device is not implementing at least a portion of a forwarding control configuration correctly;
determining, based on the network flow data, configuration coverage associated with the forwarding control configuration;
identifying, using the configuration coverage and the forwarding control configuration, non-coverage,
wherein the generation of the plurality of synthetic packets is based on the non-coverage; and
based on the determination, initiating a remediation action.

16. The method of claim 15, wherein the forwarding control configuration comprises at least one of: an access control list, a set of routing policies, and a quality of service (QoS) configuration.

17. The method of claim 15, wherein the remediation action comprises rebooting the network device.

18. The method of claim 15, wherein the remediation action comprises quarantining the network device.

19. The method of claim 15, wherein the remediation action comprises installing updated software on the network device.

* * * * *